(12) United States Patent
Shi (10) Patent No.: US 12,027,771 B2
(45) Date of Patent: Jul. 2, 2024

(54) PHASED ARRAY MODULE

(71) Applicant: PHARROWTECH, Leuven (BE)

(72) Inventor: Qixian Shi, Kessel-Lo (BE)

(73) Assignee: PHARROWTECH, Leuven (BE)

( * ) Notice: Subject to any disclaimer, the term of this patent is extended or adjusted under 35 U.S.C. 154(b) by 123 days.

(21) Appl. No.: 17/787,758

(22) PCT Filed: Dec. 22, 2020

(86) PCT No.: PCT/EP2020/087676
§ 371 (c)(1),
(2) Date: Jun. 21, 2022

(87) PCT Pub. No.: WO2021/130252
PCT Pub. Date: Jul. 1, 2021

(65) Prior Publication Data
US 2023/0085064 A1 Mar. 16, 2023

(30) Foreign Application Priority Data

Dec. 24, 2019 (EP) ..................................... 19219583

(51) Int. Cl.
*H01Q 3/26* (2006.01)
*H01Q 21/00* (2006.01)
*H01Q 21/06* (2006.01)
*H04B 17/11* (2015.01)

(52) U.S. Cl.
CPC ......... *H01Q 21/0025* (2013.01); *H01Q 3/267* (2013.01); *H01Q 21/062* (2013.01); *H01Q 21/065* (2013.01)

(58) Field of Classification Search
CPC  H01Q 3/26; H01Q 3/267; H01Q 3/38; H01Q 3/40; H01Q 1/2283; H01Q 21/0025; H01Q 21/06; H01Q 21/062; H01Q 21/065; H04B 17/00; H04B 17/11; H04B 17/12
See application file for complete search history.

(56) References Cited

U.S. PATENT DOCUMENTS

| | | | | |
|---|---|---|---|---|
| 11,664,593 | B1 * | 5/2023 | Veysoglu | H01Q 21/065 343/702 |
| 11,843,187 | B2 * | 12/2023 | Coutts | H01Q 5/42 |
| 2011/0006949 | A1 * | 1/2011 | Webb | H01Q 3/267 342/368 |

(Continued)

OTHER PUBLICATIONS

Search Report from corresponding European Application No. 19219583. 2, Jun. 26, 2020.

(Continued)

*Primary Examiner* — Thai Pham
(74) *Attorney, Agent, or Firm* — Workman Nydegger (57) ABSTRACT

A phased array module includes a plurality of antenna boards. Each antenna board has an identical layout and has a plurality of antenna elements so positioned that together they form a matrix pattern on the antenna board and an integrated circuit containing a plurality of transceiver devices. Each transceiver is connected with an antenna element on the antenna board, such that corner antenna elements of three adjacent antenna boards of the plurality form an equilateral triangle. The matrix pattern formed by the plurality of antenna elements is square-shaped or rectangular-shaped.

16 Claims, 10 Drawing Sheets

(56) References Cited

U.S. PATENT DOCUMENTS

| | | | |
|---|---|---|---|
| 2011/0074646 A1* | 3/2011 | Snow | H01Q 19/28 |
| | | | 343/850 |
| 2011/0248796 A1* | 10/2011 | Pozgay | H01Q 25/02 |
| | | | 333/137 |
| 2015/0255868 A1* | 9/2015 | Haddad | H04B 17/12 |
| | | | 342/368 |
| 2017/0054221 A1 | 2/2017 | West et al. | |
| 2017/0207547 A1* | 7/2017 | Zhai | H01Q 21/065 |

OTHER PUBLICATIONS

International Search Report from PCT Application No. PCT/EP2020/087676, Mar. 12, 2021.

* cited by examiner

PHASED ARRAY MODULE

FIELD OF THE INVENTION

The present invention is generally related to the field of millimetre-wave phased array modules for high data rate communications.

BACKGROUND OF THE INVENTION

The frequency band available around 60 GHz offers up to 9 GHz of bandwidth for use in high-speed wireless communication and negligible interference. The 60 GHz band, in comparison with the current low radio-frequency (RF) wireless services, is considered very promising for very high throughput for example for 4G and 5G cellular systems. Wireless transceivers (i.e. devices comprising both a transmitter and a receiver) operating in this frequency range often utilize phased arrays (also referred as beamformers) to relax the wireless link budget. As a result, beamforming circuits are needed in such systems. Millimetre-wave beamforming requires two operations: in a transmitter, splitting the signal over the different antenna paths followed by phase shifting the signals, and, in a receiver, phase shifting the signals in the different antenna paths and then combining the signals. The beamformer can be implemented in various ways.

A module for beamforming often comprises a plurality of integrated circuits, each containing a number of transceivers, embedded in the module. Each transceiver is connected to a different antenna of an antenna board. In conventional phase array modules only the integrated circuit (IC) arranged to act as master node is provided with a single baseband block and single mixer and frequency synthesis blocks. The ICs acting as passive slave chips only contain the phase shifting and amplifier functionality.

In production phase, such a multi-chip phased array module contains chips of different process corners. This variance impacts the output gain and phase performance and so causes a need for calibration. Traditional calibration during the production process requires an expensive setup containing millimetre-wave equipment which increases the one-time calibration cost.

Moreover, during its long-term operation the millimetre wave phased array module also requires online, in-situ calibration to compensate for temperature variance and aging effect. Traditional phased array modules with a single master node without auxiliary circuit however cannot support such features.

Figure 1:
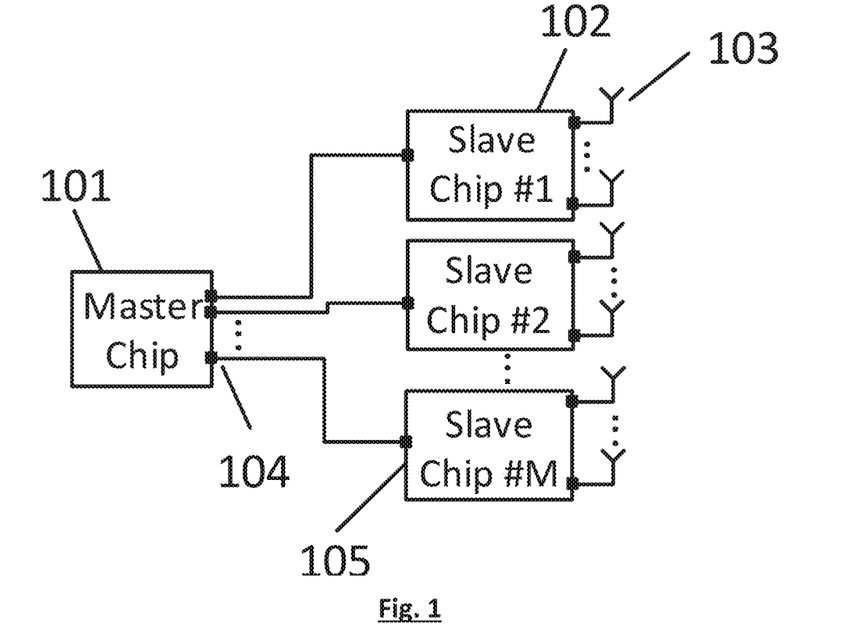
FIG. 1 illustrates a phased array module comprising a master chip and slave chips, including antennas and connection Input/Output ports.
Figure 2:
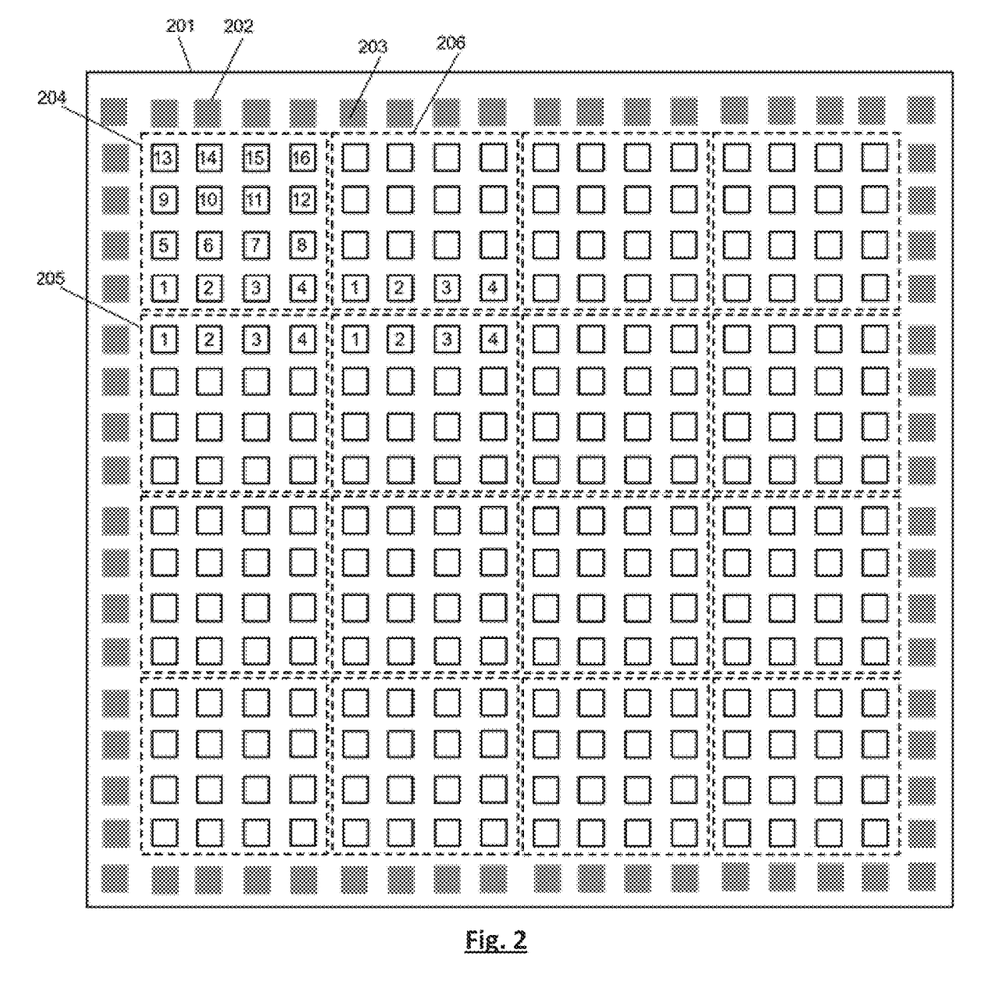
FIG. 2 illustrates an arrangement of slave chips of a phased array module as known in the art.

As illustrated in FIG. 1, the phased array module comprises a plurality of chips, one of which is arranged to act as a master node (101) while the remaining chips (102) form a plurality of slave chips. Each chip comprises a plurality of transceivers, each connected to an antenna element of the antenna board comprising the chip and including an antenna switch. The slave chips each receive their input signal via an input/output interface from an antenna output signal of the chip acting as master node. Assuming the master node contains M (e.g. 16) antenna elements and each slave node N (e.g. 16) antennas, a MxN (e.g. 256) antenna module is obtained. A typical antenna board top view of a phased array module is shown in FIG. 2, where a scenario is considered where each slave node comprises N=16 patch antennas (represented as little squares), arranged in a regular pattern of equally spaced rows and columns. Within the layout, the minimum distance between two neighbouring antennas is half the wavelength (i.e. $\lambda/2$). The dashed squares in FIG. 2 indicate the segment boundaries between slave nodes. To reach an improved beam steering performance, the phase and gain information of each transceiver frontend/antenna path must be calibrated. Due to various circumstances, e.g. production tolerances, network conditions, interference etcetera, signals transmitted via different antenna paths may undergo different phase and/or time delay shifts than one would expect, so leading to a decreased performance. By in-situ calibration this effect can be reduced or even eliminated.

In order to be able to calibrate each node of the phase array module, i.e. to calibrate all antenna paths of that node, the node comprises one antenna used as a reference antenna. Calibration of the phase shift or gain of each pair of antennas is then performed with respect to the reference antenna. For any slave node the pair of antennas may belong to a same chip or to two neighbouring slave chips.

To perform a calibration over any two signal paths it is required to find a reference_antenna so positioned that the geometric distance to the two paths under calibration is the same. For example, with reference to FIG. 2, in the slave node 204 the calibration of antennas '1' and '3' can be performed using antenna '6' (hence, using a reference antenna on the same chip) or using antenna '2' of slave chip 205 as a reference. Also front-end paths belonging to different chips of the phased array module need to be calibrated. For example, antenna '4' of slave chip 205 can serve as a reference when calibrating antenna '3' of slave chip 204 and antenna '1' of slave chip 206. Examples can be found in the columns as well, e.g. using antenna '1' of slave chip 206 as reference one can also calibrate the pair of antennas consisting of '8' of slave chip 204 and antenna '4' of slave chip 205. Also diagonal antenna elements can be linked, for example antenna '3' in slave chip 205 can be used as reference to calibrate antenna '1' of slave chip 206 and antenna '8' of chip 204.

Figure 3:
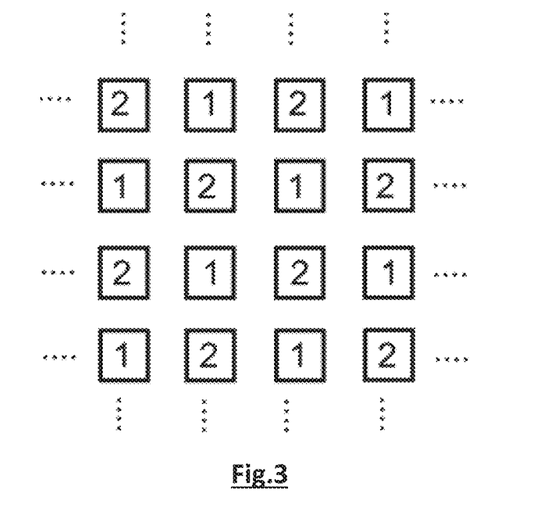
FIG. 3 illustrates how two sets of calibrated elements are obtained within the same slave node with the arrangement of FIG. 1.

From the given examples it can be seen that calibration of a relative mismatch (e.g. in gain or phase shift) between antennas in each slave node leads to two subsets of elements, labelled as 1 and 2 on the antenna patches as illustrated in FIG. 3. Elements of a same subset are found on diagonals. Only antennas of the same subset can be combined in a single calibration step using some reference antenna. There is, however, no calibration possible using an element of the first subset and an element of the second subset, because no reference antenna can be found with equal distance between nodes with label '1' and label '2' in FIG. 3. The antenna layout is the blocking limitation to achieve this.

Solutions have been presented in the art wherein self-calibration (also named autocalibration) is implemented in a phased array module, i.e. wherein the phased array module itself is so equipped that it can be used to perform calibration of the module without any external connections.

In US2015/255868 a method and apparatus for self-calibration of an antenna array is disclosed. The apparatus includes first and second couplers, a calibration transceiver and a controller. The first coupler operably is connected to a first number of antennas. The second coupler is operably connected to a second number of antennas. The calibration transceiver is operably connected to the first and second couplers via a common path. The controller is configured to perform calibration on at least one or more transmit/receive paths for the second number of antennas based on one or more signals received from or transmitted to the first and second couplers via the common path by the calibration transceiver.

In US2011/248796 an RF feed network for antenna arrays is disclosed. In some implementations the tile architecture of an array antenna is comprised of a plurality of subarrays, whereby each subarray contains eight rows each with 8 antenna elements. The even numbered rows are somewhat offset with respect to the odd numbered rows.

Hence, there is a need for a phased array module with antennas so positioned on the respective antenna boards that calibration can be performed without limitations as in the prior art solutions.

SUMMARY OF THE INVENTION

It is an object of embodiments of the present invention to provide for a phased array module wherein antenna boards of the phased array module are so arranged as to allow performing calibration in a flexible way.

The above objective is accomplished by the solution according to the present invention.

In a first aspect the invention relates to a phased array module comprising a plurality of antenna boards. Each antenna board has an identical layout and comprises a plurality of antenna elements so positioned to form together a same regular pattern on the antenna board and an integrated circuit containing a plurality of transceiver devices each connected with an antenna element on the antenna board. The corner antenna elements of three adjacent antenna boards of the plurality of antenna boards form an equilateral triangle. The proposed module is characterised in that the matrix pattern has the shape of a square or a rectangle.

The proposed solution indeed allows for a flexible and complete calibration of the individual antenna paths. Due to the positioning of the corner antennas as an equilateral triangle and the antenna elements of each antenna board being in a regular matrix pattern (identical for each antenna board), the antenna elements along the edges of adjacent antenna boards are positioned so that two antenna paths can be calibrated while using the third antenna element as a reference, as the latter has the same geometrical distance to the two antennas of the paths being calibrated. Due to the regular antenna pattern within each antenna board also calibration within the antenna board can be performed.

Advantageously all antenna elements of an antenna board have a same signal path length to the integrated circuit to which the antenna elements are connected.

In some embodiments each integrated circuit comprises $N^2$ antennas, with N equal to an integer number.

In preferred embodiments one integrated circuit of an antenna board of the plurality is arranged to act as a master node and the integrated circuits of the remaining antenna boards are arranged to act as slave nodes, which in receive mode each receive as input a signal output by a different antenna element of the master node, or, in transmit mode, each transmit as output a signal input by a different antenna element of the master node. The integrated circuit acting as master node and the integrated circuits acting as slave nodes advantageously have a same architecture.

The integrated circuit acting as master node and the integrated circuits acting as slave nodes preferably have a same number of antenna elements.

In some embodiments the master node is connected to a baseband circuit arranged for processing baseband input/output signals. Advantageously, the phased array module further comprises an analog-to-digital converter to process the baseband signals.

In a preferred embodiment the integrated circuit arranged to act as a master node and its antenna board are on one side of a base board and the integrated circuits arranged to act as a slave nodes and their antenna board on the opposite side of the base board.

In one embodiment at last one integrated circuit of the phased array module comprises a tone generator for generating a test signal for calibration.

In another embodiment the clock of an integrated circuit of a slave node operable as reference is connected to the clock of the integrated circuit acting as master node.

In yet another embodiment an integrated circuit is configured as a slave node, whereby one antenna element of the antenna board of said slave node is arranged to be reference receive antenna and two or more other antenna elements of said antenna board are arranged as transmit antenna elements. In such case there is no need to have an integrated circuit in the phased array module that is configured as master node.

In another aspect the invention relates to a method for calibrating a pair of antenna elements of a phased array module as in any of the previous claims. The method comprises:
  selecting in the phased array module two antenna paths to be calibrated, each antenna path comprising an antenna element of said pair and an RF frontend to which the antenna element is connected,
  selecting in the phased array module a further antenna element as reference antenna in a reference antenna path, said reference antenna path also comprising a RF front end to which the reference antenna is connected, whereby the reference antenna is so positioned that the geometric distance to the two antenna paths is the same,
  calibrating the pair of antenna elements by using the two antenna paths for transmitting a signal and the reference antenna path for receiving the transmitted signal, or vice versa, whereby the transmitted signal propagates through antenna spill over.

The pair of antenna elements may in some embodiments be calibrated in transmit mode, whereby the reference antenna then serves a reference receiver. In other embodiments the antennas are calibrated in receive mode and the reference antenna can be seen as reference transmitter. The calibration comprises configuring the RF front ends, e.g. in gain and phase shift, of the respective antenna paths used in the calibration procedure.

In some embodiment performing the calibration comprises a gain or phase shift comparison for said two antenna paths.

In embodiments the two antenna elements are located on a same antenna board. In other embodiments the reference antenna and one of the two antenna elements are located on a same antenna board.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention presents a phased array module comprising a plurality of antenna boards each comprising an integrated circuit. The architecture of the integrated circuits, which each contain a plurality of transceivers, and the antenna module design allow implementing autocalibration during the production phase as well as on-site calibration. In this way the test and calibration cost at production stage can be reduced. With the proposed solution, the phase and gain variance of each antenna path of the phased array module can be calibrated with low cost.

The phased array module comprises a plurality of integrated circuits (ICs) each provided on a different antenna board. The phased array module has a same high level representation as in FIG. 1 already shown previously: one of the integrated circuits and its associated antenna board can be arranged to act as a master node 101 and the other integrated circuits as slave nodes 102, to each of which a plurality of antenna 103 is connected. The connect port in the master chip is output I/O 104 and each slave chip is connected to the master chip via an input I/O 105. The various integrated circuits of the phased array module are in this description also referred to as tiles or just chips. Preferably the master chip and the slave chips have the same architecture. However, in principle the master chip may have a different architecture than the slave nodes in certain embodiments. In the description below all ICs are assumed to have a same schematic. Using only one type of chip to implement a master/slave multi-tile configuration yields clear benefits as will become apparent.

Figure 4:
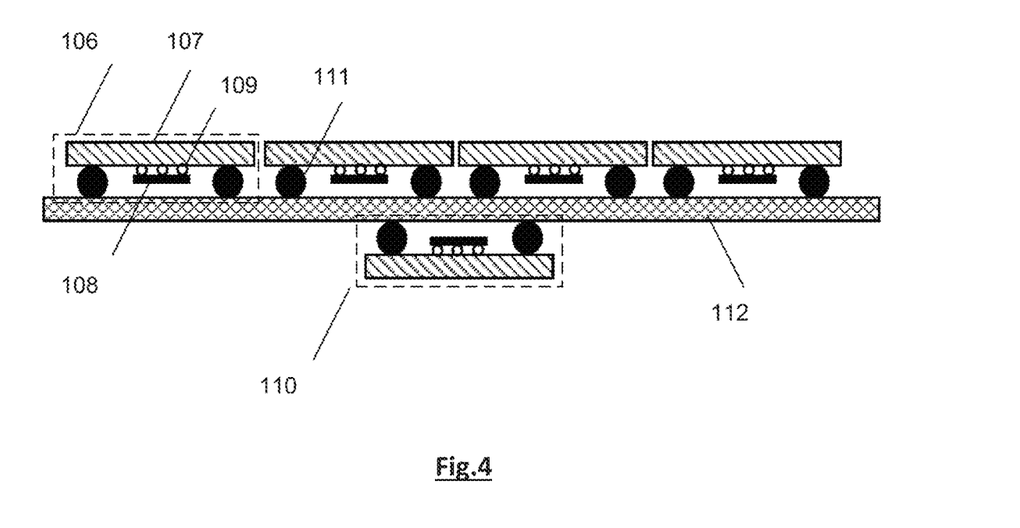
FIG. 4 illustrates a cross-section of a phased array module comprising a master node and a plurality of slave nodes.

A typical cross section view of a multi-chip phased array module obtained after assembly of the chips, with one chip acting as master node and a plurality of slave nodes, on the respective antenna boards, is shown in FIG. 4. A plurality of antenna boards 107 each comprising a plurality of antenna elements, e.g. patch antennas, are connected via RF solder bumps 109 to a base board 112 of the phased array module. Each antenna board comprises an integrated circuit which is connected to the antenna board via a RF pillar 111. Typically an antenna board provided with the integrated circuit acting as the master node 110 is placed at one side of the base board and the antenna boards 107 with the chips 108 acting as slave nodes 106 are at the opposite side of the base board. Instead of patch antennas also the use of for example monopole, dipole or bowtie antennas can be envisaged.

Figure 5:
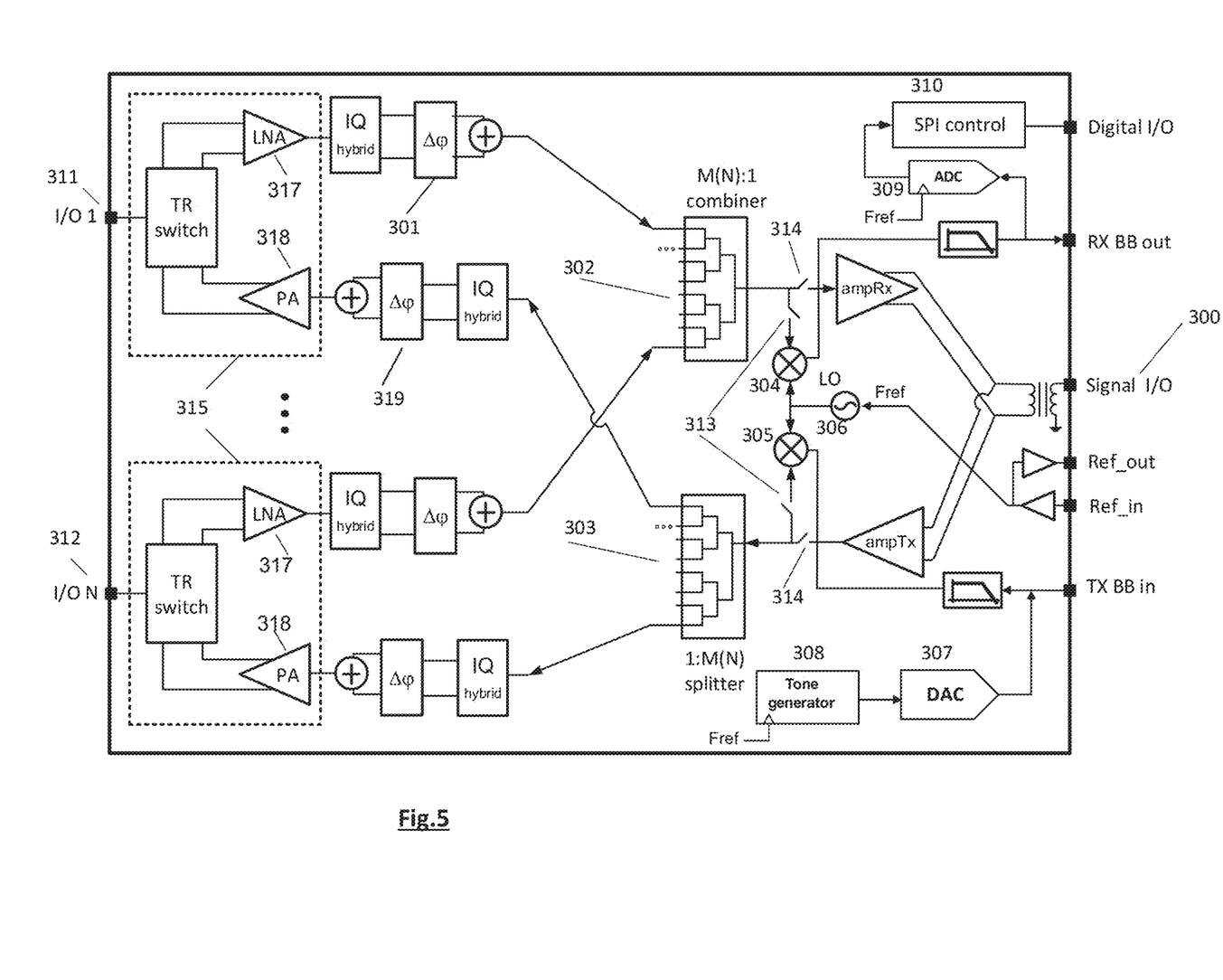
FIG. 5 illustrates a possible architecture of an integrated circuit for use in a phased array module according to the invention.
Figure 6:
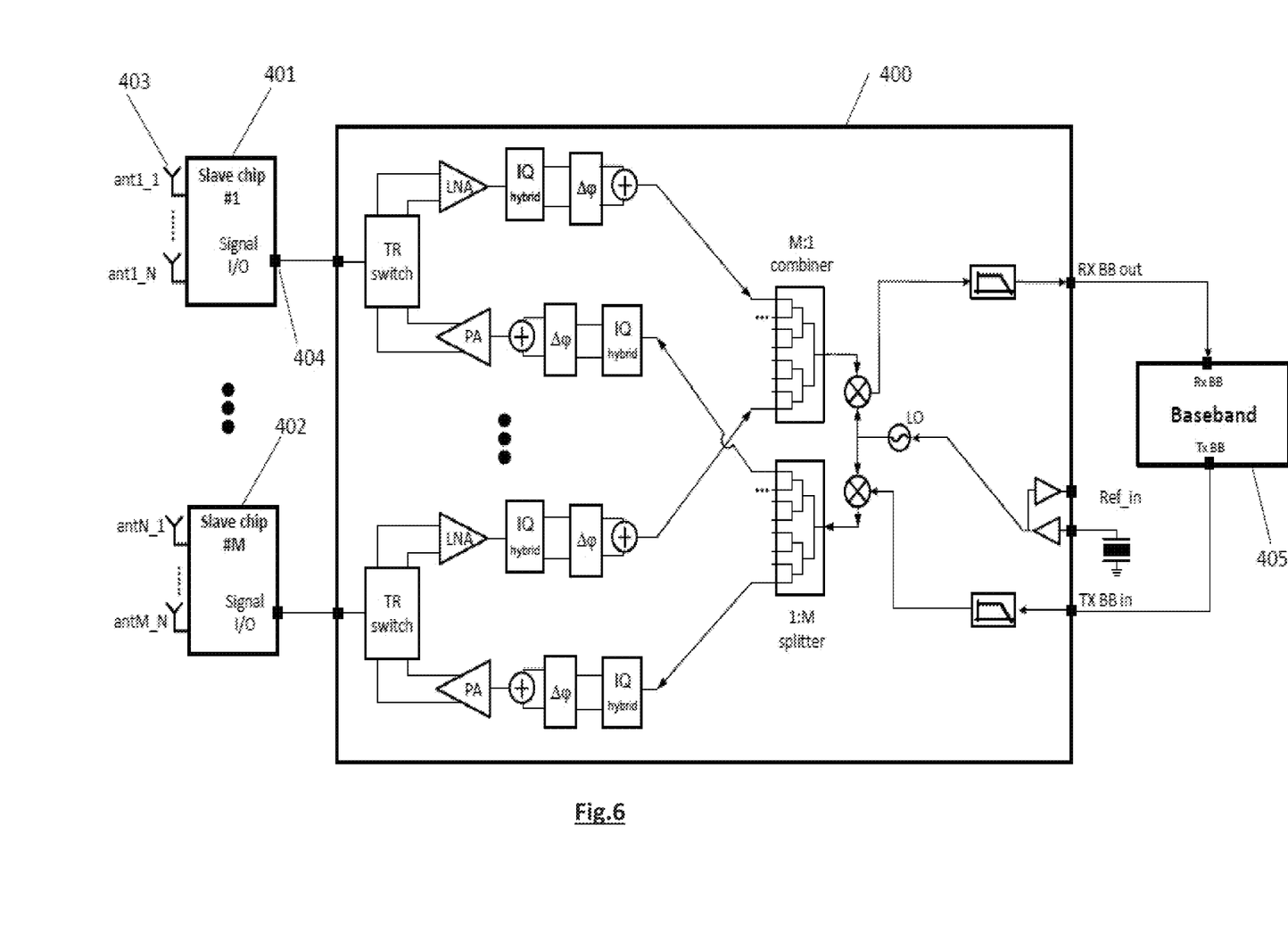
FIG. 6 illustrates the architecture of FIG. 5 adapted for use as a master node.
Figure 7:
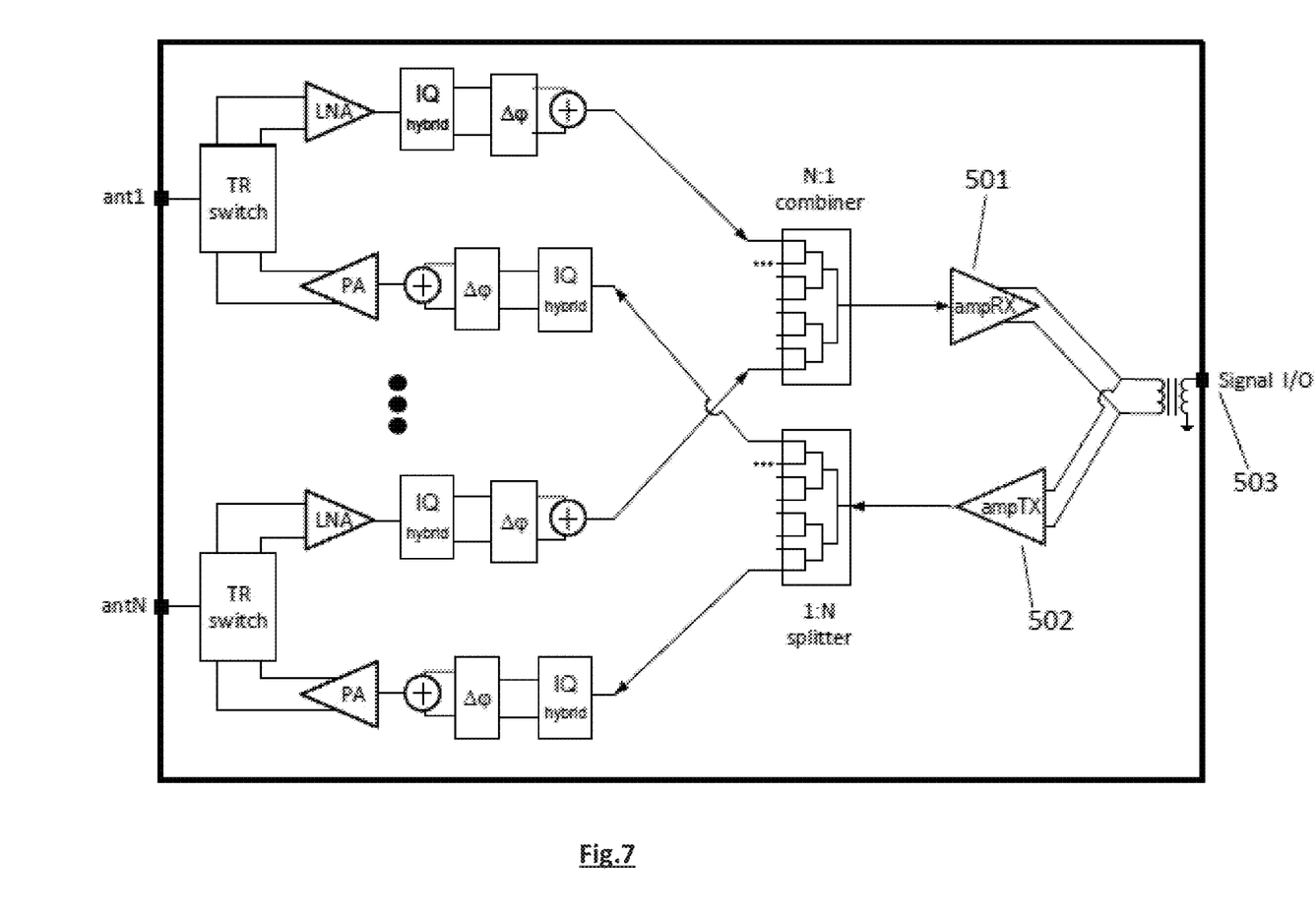
FIG. 7 illustrates the architecture of FIG. 5 adapted for use as a slave node.

FIG. 5 illustrates an architecture of an integrated circuit that can be applied in a phased array module according to the present invention. On chip level, there are a number of parallel transceiver front-ends (313), typically one with transmit functionality and one with receive functionality, on a same die connected with a power combiner (302)/splitter (303) and a transmit phase shifter (319)/receive phase shifter (301). Each antenna front-end (315) can be configured as either transmitter or receiver independently by means of an antenna switch (shown as 'TR switch' in FIG. 5). The integrated circuit also includes baseband and local oscillator (LO) (306) functionality needed for operation as a master node. The IC of FIG. 5 configured to act as a master node can up/down convert (304/305) the baseband signal by the local oscillator and mixer blocks when the paths for RF signal I/O (300) are muted and the switches (313) are closed to connect to the mixer. This is illustrated in FIG. 6. The IC of FIG. 5 can also be configured to act as a slave node by muting the LO, baseband processing blocks and mixers in FIG. 5 and closing the switches (314) to the signal I/O. The final configuration so obtained is shown in FIG. 7. In that case, the splitter (303) and combiner (302) of the slave node transmit and receive the modulated mm-wave signal via the signal I/O interface (311/312) connected to the master node. To steer the beam at each slave node transceiver element, the phase shifter (301/319) at each signal path controls the signal phase independently.

FIG. 6 illustrates an integrated circuit acting as a master node and its connection with a number of ICs (for example M=16) acting as slave nodes to form all together a phased array transceiver module under normal operation. Antennas (403) are connected in the slave nodes via each antenna I/O interface (404). In this case a master chip (400) with M I/O ports to connect to M slave chips, which are each provided with N antennas, form a M×N-antenna module. A baseband IC (405) processes the baseband input/output signals.

FIG. 7 illustrates an IC being operative as a slave node. The LO and baseband parts are disabled where the RF amplifier for Rx (501) and for Tx (502) are connected to the signal IO (503), which is further connected to the master chip. It is noted that under normal operation a slave node IC is configured either as a transmitter or as a receiver for all antenna paths simultaneously, because the I/O interface (503) is shared by the receive amplifier (501) and the transmit amplifier (502) of the slave node.

A calibration is performed by comparing each time e.g. the gain and/or phase shift for two antenna paths using a reference antenna path where the active antenna paths and reference antenna path are from the same mother board (112). An antenna path includes an antenna element and an RF frontend formed by the antenna front end (315) and a phase shifter (301,319). In receive mode, the gain is adjusted by low-noise amplifier, LNA, (317) and phase shifter (301). In transmit mode, the gain is adjusted by power amplifier, PA, (318) and phase shifter (319) It is noted that the propagation occurs through antenna leakage/spill over where no explicit electromagnetic coupler is required. This results in a simpler circuit implementation. The chip the reference antenna is connected to, is referred to as the reference chip. An antenna path comprises the antenna element itself as well as the RF frontend to which the antenna is connected. The two RF frontends with their respective antennas may belong to a same slave node or to two different nodes. Also the reference antenna that is part of the reference antenna path, may be located on the antenna board containing one of the antennas under calibration or on the antenna board of a different slave node. If the antennas are calibrated in a transmit mode, the integrated circuit the reference antenna is connected to, is referred to as a reference receiver. If the antennas are calibrated in a receive mode, the integrated circuit the reference antenna is connected to, is referred to as a reference transmitter.

For calibration purposes, the integrated circuit of FIG. 5 also includes a tone generation block (308) and the calibration DAC (307) that is activated in the chip configured as master node when two antenna paths are to be calibrated in transmit mode and the master chip thus operates as transmitter. In this case, two slave antenna frontends are configured as slave transmitter and cascaded to the master node. As already mentioned, the two slave antenna frontends may belong to a same slave node or to two different slave nodes. Thanks to the distribution of reference frequency (315) across the board through the module, the transmit and receive node are well synchronized; thus no third part external circuit/equipment is needed.

Similarly, when two slave antenna frontends are configured as receiver in calibration, the slave receiver is connected to the master IOs (311/312). In the master chip the downconversion mixer (304) is enabled. The baseband signal goes to a calibration ADC block (309) in the master chip, where the digitally quantized gain and phase information is accessible via a Serial Peripheral Interface (SPI) port (310). The integrated circuit of one specific node operates as reference transmitter and its tone generator (308), DAC (307), LO (306) and upconversion mixer (305) are enabled.

In order to be able to calibrate each slave node, i.e. to calibrate all antenna paths of that node, the node needs an antenna path to be used as a reference antenna path, as already mentioned. Calibration of the phase shift or gain of each pair of antennas paths is performed with respect to the reference antenna. Note that for any slave node the pair of antennas under calibration may belong to a same IC or may contain one antenna of that slave IC and one antenna of a neighbouring slave IC.

Figure 8:
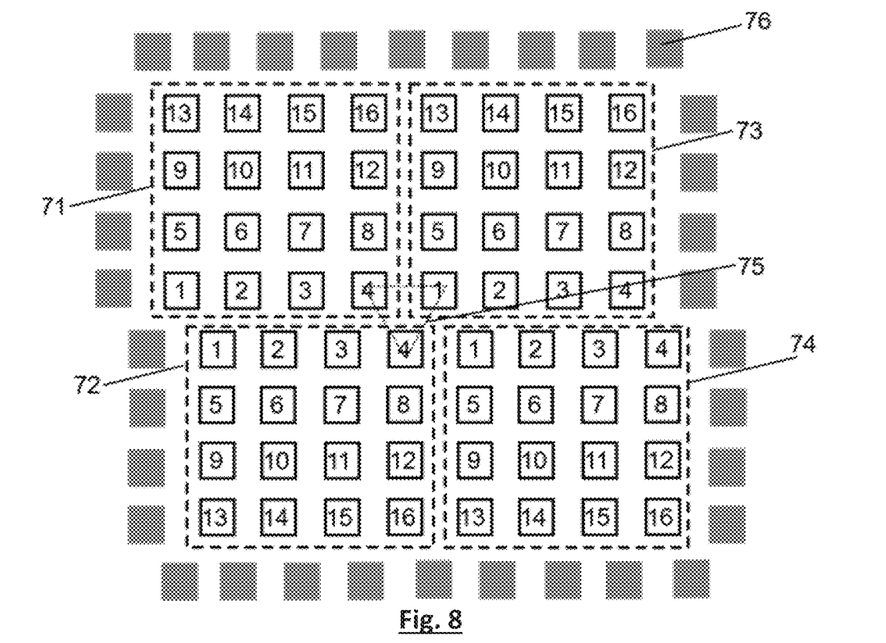
FIG. 8 illustrates an arrangement of the slave tiles of the phased array module according to an embodiment of the invention.

The present invention presents a phased array module comprising a plurality of slave nodes so arranged that the drawback is overcome that the calibration is to be performed separately for different subsets (see FIG. 3). It is recalled that to perform a calibration over any two signal paths it is required to find a reference transmitter or receiver antenna so positioned that the geometric distance to the two paths under calibration is the same. To achieve a low-loss signal routing from one slave tile to N antenna patches while maintaining a full coverage of antenna elements, an offset is introduced between either rows or columns of different slave tiles to form an equilateral triangle (75) between the antenna elements of antenna boards of different slave nodes positioned at the edges between three adjacent slave nodes. With adjacent slave nodes is meant that those slave nodes pair-by-pair can be considered adjacent or neighbouring. FIG. 8 provides an illustration. In this embodiment the antenna arrangement within the same antenna board is kept square shaped to allow for H-shape signal routing. All antenna boards have the same arrangement. The antenna elements on each antenna board are thus positioned to form together a same matrix pattern as on the other antenna boards. Note that at the outside dummy antennas (76) may be provided. These are used to ensure the edge patch antennas have similar surroundings (i.e. a similar electromagnetic environment) as the centre antennas.

Figure 9:
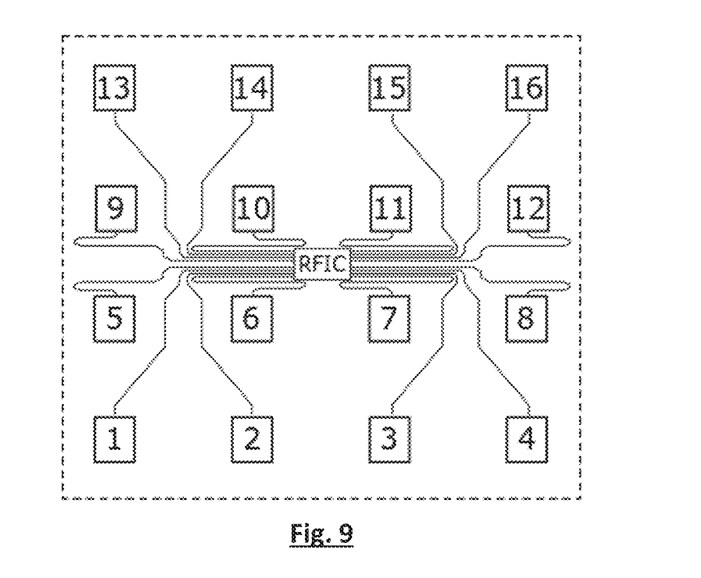
FIG. 9 illustrates a chip-to-antenna signal routing for the arrangement of FIG. 8.

In the scheme of FIG. 8 antenna element '1' in 72 can be used as reference to calibrate antennas '1' and '2' in tile 71. Antenna '5' in tile 73 can be reference for antennas '4' and '12' in tile 71. Similarly, element '9' in 73 can be reference for antennas '8' and '16' in 71. In this way odd and even rows can be calibrated. Moreover, adjacent rows can be calibrated in this configuration by using antenna '3' in 71 or '9' 73 as a reference for the antenna pair '4/7' in 71. To calibrate mismatches between different tiles, antenna '4' in 72, antenna '4' in 71 and antenna '1' in node 73 form an equilateral triangle which can be used in the calibration procedure as well. In other words one can also state that antenna '4' in 72, antenna '4' in 71 and antenna '1' in node 73 together with antenna '1' of tile 74 form a parallelogram (and different from a rectangle). Calibration of antennas '4' and '8' in tile 71 can be done by linking the relative phase and gain information among calibrated pairs of '4/7' and '7/8' in tile 71, where antenna element '7' in tile 71 is used as an intermediate node help to propagate. The proposed configuration reduces the local signal routing complexity in certain embodiments of the invention, like e.g. in the embodiment shown in FIG. 8, while keeping full self-calibration coverage. FIG. 9 shows the symmetric chip to antenna signal routing where each signal path is of the same length. Thanks to the square antenna matrix layout as in FIG. 8, it is much easier to equalize the distance than a non-square shape floorplan of the patch antennas.

Figure 10:
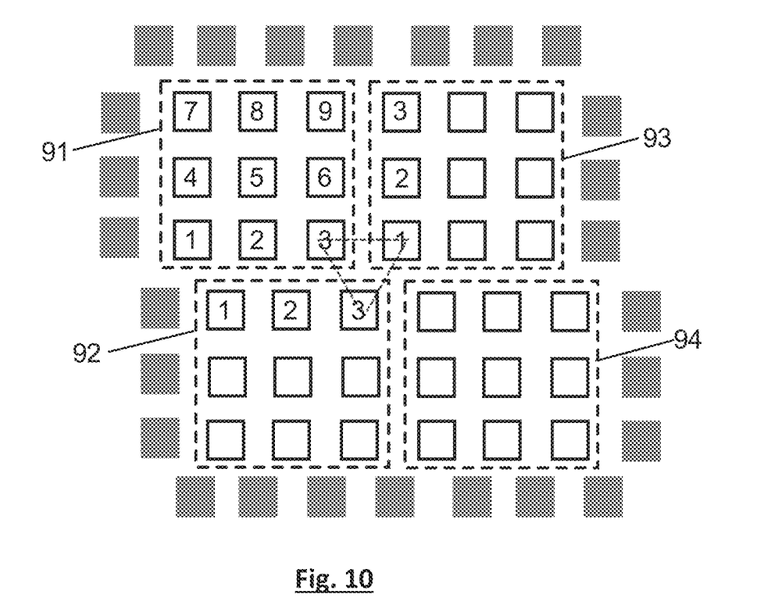
FIG. 10 illustrates an arrangement of the slave tiles with a 3×3 antenna array according to an embodiment of the invention.

In another embodiment tiles are used that form an odd number squared array, like for example the 3×3 array of FIG. 10. As in the previously discussed embodiments an equilateral triangle, in FIG. 10 formed by antenna '3' in tile 92, antenna '1' in 93 and antenna '3' in tile 91, at the boundary corner is preserved. Antenna path towards/from antennas '4' and '5' from tile 91 can be calibrated via antenna '1' in tile 92. Considering the antennae '5' and '1' in tile 91, they can be calibrated by using antenna '2' in the same tile as a reference. The antenna '4' calibration can propagate back to antenna '1' in tile 91 by using antenna '5' as an intermediate node as the relative gain/phase between '5' and 1' is known.

Figure 11:
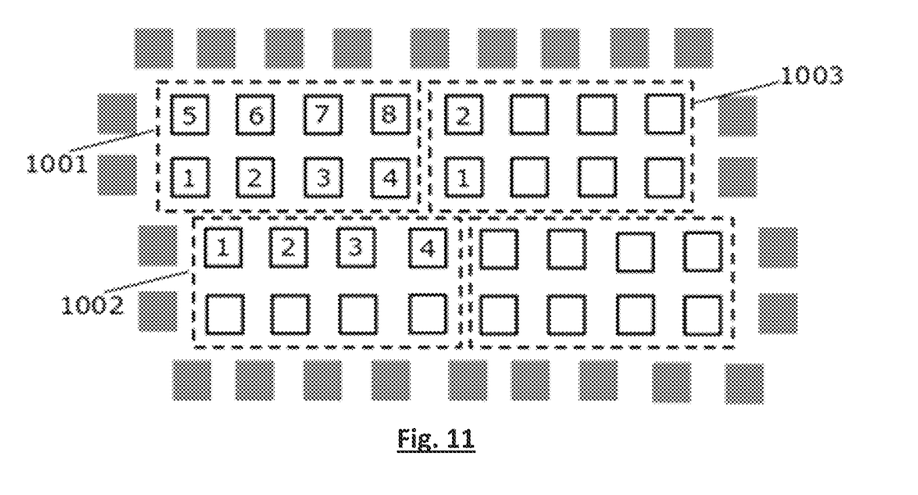
FIG. 11 illustrates an arrangement of the slave tiles with rectangular shape according to an embodiment of the invention.

Yet another embodiment is illustrated in FIG. 11. The antenna layout here has in each tile a rectangular shape, which does not contain $N^2$ antennas. Here, to propagate vertically by linking antennas '7' and '4' in 1001, only antenna element '3' in 1001 can be used for reference, as there is no reference node in tile 1003 that can serve as a possible reference.

Figure 12:
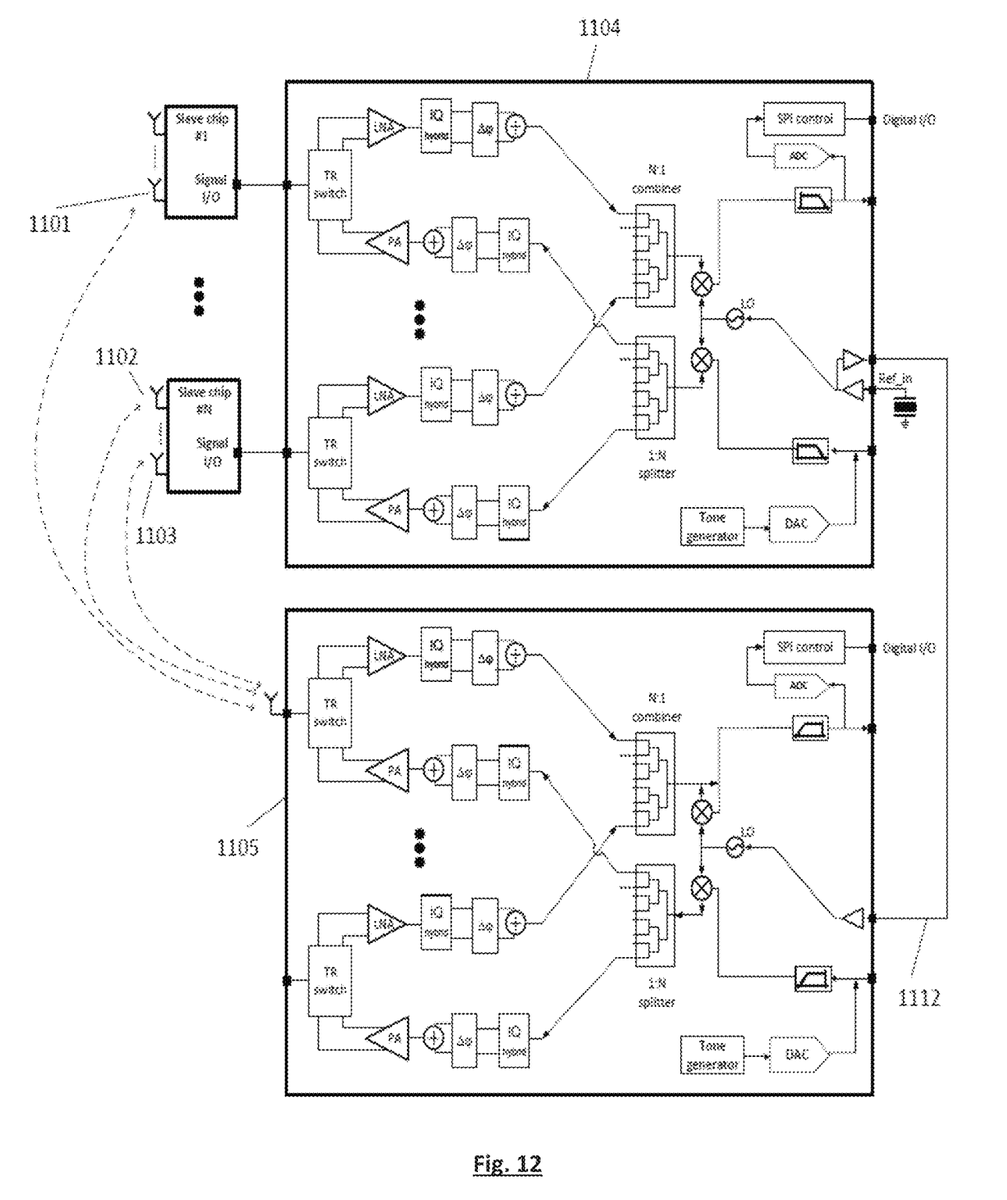
FIG. 12 illustrates the master and slave chip configuration when a certain antenna is under calibration.

FIG. 12 shows the phased array module and a chip configuration when the phased array module is calibrated for antenna paths of several transmitter slave nodes. Assume that e.g. a low frequency IQ sinusoidal signal is generated from the on-chip tone generator and DAC in the integrated circuit (1104) of the master node. The tone is upconverted with the LO block in the master chip and is fed to slave chips via their I/O port. The signal is further amplified in the slave nodes and fed to open space via an antenna in the slave nodes. A selected chip (1105) is configured as reference receiver to process the spill-over leakage signal, i.e. the signal portions that leak back from the various transmitter slave antennas (1101, 1102, 1103) when they transmit their signal (see FIG. 11). In the reference receiver the LO block runs at the same frequency of the master chip. Thus, after downconversion and A/D conversion, the phase and gain information is measured by the ADC. To keep an identical environment for the antenna path under calibration such that the spill over path is matched, any other front end circuit is disabled. It is noted that when a chip operates as reference transceiver, its reference clock is connected to master chip (1112) to keep the coherence.

Figure 13:
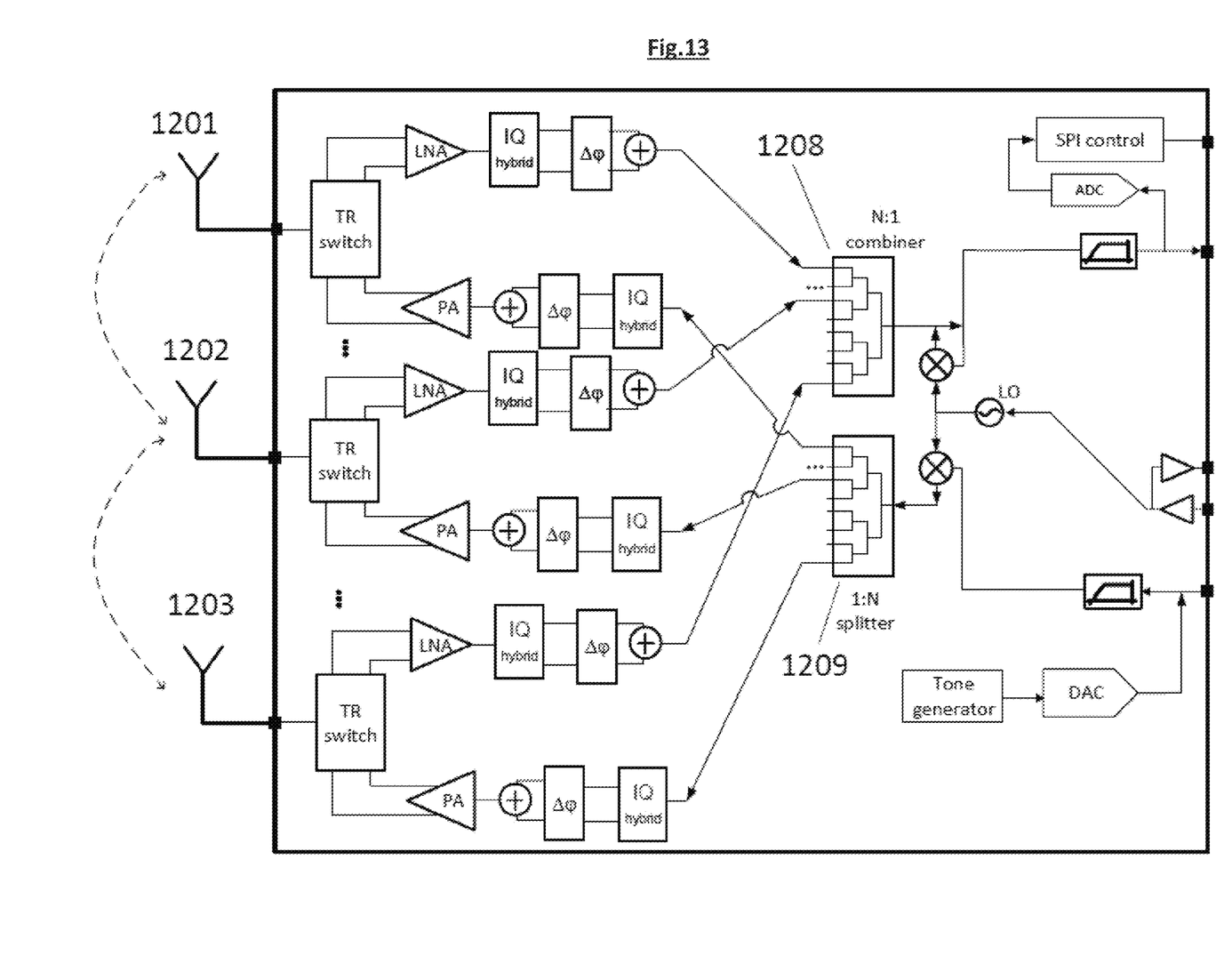
FIG. 13 illustrates another configuration when the reference antenna belongs to the same chip as the antennas under calibration.

FIG. 13 illustrates the scenario when the antenna paths under calibration and the reference path are located at the same slave node where the master chip is redundant. A tone signal is generated, upconverted and split to frontend/antennas 1201 and 1203. Assuming antenna 1202 is the reference antenna, the received signal is fed to the mixer and downconverted with the common LO shared with the transmitter. Then the phase/amplitude information is obtained via the ADC. In other words, all processing may in this case be performed in the slave node.

A similar configuration can be implemented for slave receiver calibration. The reference antenna then is a transmitter antenna via which a test signal for calibration is transmitted that is generated using the tone generator and DAC shown in FIG. 13. Antennas 1201 and 1203 now are receive antennas which each receive said test signal. The combined signal is then fed to the mixer and so on. Such scenario corresponds to the case mentioned in FIG. 8 when '7' and '4' in tile 71 uses '3' as a reference.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or

The invention claimed is:

1. A phased array module comprising a plurality of antenna boards, each antenna board having an identical layout, and said antenna board comprising a plurality of antenna elements positioned to form together a matrix pattern on said antenna board and an integrated circuit containing a plurality of transceiver devices, each transceiver in said plurality of transceiver devices is connected with an antenna element on said antenna board,
wherein corner antenna elements of three adjacent antenna boards of said plurality of antenna boards form an equilateral triangle,
wherein said matrix pattern formed by said plurality of antenna elements is square shaped or rectangular shaped.

2. The phased array module as in claim 1, wherein each antenna board comprises $N^2$ antennas, N being an integer number.

3. The phased array module as in claim 1, wherein an integrated circuit of an antenna board of said plurality is arranged to act as a master node and the integrated circuits of the remaining antenna boards of said plurality are arranged to act as slave nodes, which, in receive mode, each receive as input a signal output by a different antenna element of said master node or, in transmit mode, each transmit as output a signal input to a different antenna element of said master node.

4. The phased array module as in claim 3, wherein said integrated circuit acting as master node and said integrated circuits acting as slave nodes have a same architecture.

5. The phased array module as in claim 3, wherein said integrated circuit acting as master node and said integrated circuits acting as slave nodes have a same number of antenna elements.

6. The phased array module as in claim 3, wherein said master node is connected to a baseband circuit arranged for processing baseband input/output signals.

7. The phased array module as in claim 6, further comprising an analog-to-digital converter to process said baseband signals.

8. The phased array module as in claim 3, wherein said integrated circuit arranged to act as a master node and its antenna board are on one side of a base board and said integrated circuits arranged to act as slave nodes and their antenna board on the opposite side of said base board.

9. The phased array module as in claim 1, wherein at last one integrated circuit comprises a tone generator for generating a test signal for calibration.

10. The phased array module as claim 1, wherein a clock of an integrated circuit of a slave node operable as reference is connected to the clock of the integrated circuit acting as master node.

11. The phased array module as in claim 1, wherein an integrated circuit is configured as a slave node,
wherein one antenna element of the antenna board of said slave node is arranged to be reference receive antenna and two or more other antenna elements of said antenna board are arranged as transmit antenna elements.

12. The phased array module as in claim 1, wherein said antenna elements of at least one of said antenna boards have a same signal path length to said integrated circuit.

13. A method for calibrating a pair of antenna elements of a phased array module, said phased array module including a plurality of antenna boards, each antenna board having an identical layout, and said antenna board having a plurality of antenna elements positioned to form together a matrix pattern on said antenna board, said phased array module further including an integrated circuit containing a plurality of transceiver devices, each transceiver in said plurality of transceiver devices is connected with an antenna element on said antenna board, wherein corner antenna elements of three adjacent antenna boards of said plurality of antenna boards form an equilateral triangle, wherein said matrix pattern formed by said plurality of antenna elements is square shaped or rectangular shaped, the method comprising:
selecting in said phased array module two antenna paths to be calibrated, each antenna path comprising an antenna element of said pair and an RF frontend to which said antenna element is connected,
selecting in said phased array module a further antenna element as reference antenna in a reference antenna path, said reference antenna path also comprising a RF front end to which said reference antenna is connected,
wherein said reference antenna is so positioned that the geometric distance to said two antenna paths is the same,
calibrating said pair of antenna elements by using the two antenna paths for transmitting a signal and the reference antenna path for receiving the transmitted signal, or vice versa,
wherein the transmitted signal propagates through antenna spill over.

14. The method for calibrating as in claim 13, wherein performing said calibration comprises a gain or phase shift comparison for said two antenna paths.

15. The method for calibrating as in claim 13, wherein said two antenna elements are located on a same antenna board.

16. The method for calibrating as in claim 13, wherein said reference antenna and one of said two antenna elements are located on a same antenna board.

* * * * *